US012670453B2

(12) United States Patent
Singh et al.

(10) Patent No.: US 12,670,453 B2
(45) Date of Patent: Jun. 30, 2026

(54) AUTOMATIC ANALYSIS, PRIORITIZATION, AND ROBOT GENERATION FOR ROBOTIC PROCESS AUTOMATION

(71) Applicant: UiPath, Inc., New York, NY (US)

(72) Inventors: Prabhdeep Singh, Bellevue, WA (US); Michelle Yurovsky, Bellevue, WA (US)

(73) Assignee: UiPath, Inc., New York, NY (US)

( * ) Notice: Subject to any disclaimer, the term of this patent is extended or adjusted under 35 U.S.C. 154(b) by 1468 days.

(21) Appl. No.: 16/707,763

(22) Filed: Dec. 9, 2019

(65) Prior Publication Data

US 2021/0110318 A1 Apr. 15, 2021

Related U.S. Application Data

(60) Provisional application No. 62/915,366, filed on Oct. 15, 2019.

(51) Int. Cl.
*G06Q 10/0633* (2023.01)
*B25J 9/16* (2006.01)
(Continued)

(52) U.S. Cl.
CPC .......... *G06Q 10/0633* (2013.01); *B25J 9/163* (2013.01); *G06N 5/04* (2013.01); *G06Q 10/06393* (2013.01)

(58) Field of Classification Search
None
See application file for complete search history.

(56) References Cited

U.S. PATENT DOCUMENTS 8,930,959 B2 1/2015 Lahr
9,555,544 B2 1/2017 Bataller et al.
(Continued)

FOREIGN PATENT DOCUMENTS

CN 104985599 A 10/2015
CN 107666987 A 2/2018
(Continued)

OTHER PUBLICATIONS

Joseph "How to Scale RPA Beyond a Pilot", Verint Connect, Joseph, Jun. 29, 2019, https://connect.verint.com/b/customer-engagement/posts/how-to-scale-rpa-beyond-a-pilot (Year: 2019).*
Celonis "What is Task Mining?" page available at https://www.celonis.com/process-mining/what-is-task-mining/#record-interactions (last accessed Dec. 6, 2019).
(Continued)

*Primary Examiner* — Rutao Wu
(74) *Attorney, Agent, or Firm* — LeonardPatel PC; Michael A. Leonard, II; Sheetal S. Patel

(57) ABSTRACT

Systems and methods for analyzing, prioritizing, and potentially automatically generating robots implementing processes and/or process flows for robotic process automation (RPA) are disclosed. Artificial intelligence (AI) may be used to analyze business processes and/or process flows and look for possible candidates for automation or improvement of existing automations. Listeners (e.g., robots, separate software applications, operating system extensions, etc.) may be employed to listen in the background on user computing systems to mine data pertaining to workflow effectiveness and/or to identify new processes and/or process flows that may improve return on investment (ROI) for RPA. For example, when automations are placed into production via robots implementing RPA workflows on user computing systems, listeners may be added to ensure that the process(es) and/or process flow(s) are correctly and accurately performing what they are intended for and/or provide data for automation of new processes and/or process flows.

20 Claims, 7 Drawing Sheets

(51) Int. Cl.
    *G06N 5/04*     (2023.01)
    *G06Q 10/0639*     (2023.01)

(56)                References Cited

U.S. PATENT DOCUMENTS

| | | |
|---|---|---|
| 9,817,967 B1 | 11/2017 | Shukla et al. |
| 10,062,009 B2 | 8/2018 | Lahr |
| 10,307,906 B2 | 6/2019 | Shah et al. |
| 10,324,457 B2 | 6/2019 | Neelakandan et al. |
| 10,339,027 B2 | 7/2019 | Garcia et al. |
| 10,365,799 B2 | 7/2019 | Hosbettu et al. |
| 10,423,859 B2 | 9/2019 | Lahr |
| 11,301,269 B1 | 4/2022 | Singh |
| 11,340,917 B2 | 5/2022 | Singh |
| 11,440,201 B2 | 9/2022 | Singh |
| 11,488,015 B2 | 11/2022 | Singh et al. |
| 2005/0144150 A1 | 6/2005 | Ramamurthy et al. |
| 2006/0129367 A1 | 6/2006 | Mishra et al. |
| 2010/0162230 A1 | 6/2010 | Chen et al. |
| 2012/0059683 A1 | 3/2012 | Opalach et al. |
| 2015/0117765 A1 | 4/2015 | Lahr |
| 2015/0213065 A1 | 7/2015 | Sisk et al. |
| 2015/0244730 A1 | 8/2015 | Vu et al. |
| 2016/0188298 A1 | 6/2016 | Vandikas et al. |
| 2017/0052824 A1 | 2/2017 | Sharma et al. |
| 2017/0060108 A1* | 3/2017 | Kakhandiki ............. G06N 5/01 |
| 2017/0173784 A1 | 6/2017 | Shah et al. |
| 2017/0206064 A1 | 7/2017 | Breazeal et al. |
| 2017/0228119 A1 | 8/2017 | Hosbettu et al. |
| 2017/0330109 A1 | 11/2017 | Maughan et al. |
| 2017/0339024 A1 | 11/2017 | Bhide et al. |
| 2017/0372442 A1 | 12/2017 | Mejias |
| 2018/0053117 A1 | 2/2018 | Caffrey |
| 2018/0074931 A1 | 3/2018 | Garcia et al. |
| 2018/0113780 A1 | 4/2018 | Kim et al. |
| 2018/0113781 A1 | 4/2018 | Kim et al. |
| 2018/0144126 A1 | 5/2018 | Swinke et al. |
| 2018/0181377 A1 | 6/2018 | Kim et al. |
| 2018/0197123 A1 | 7/2018 | Parimelazhagan et al. |
| 2018/0284709 A1 | 10/2018 | Dubey et al. |
| 2018/0329399 A1 | 11/2018 | Neelakandan et al. |
| 2018/0341688 A1 | 11/2018 | Ganesh et al. |
| 2018/0345489 A1 | 12/2018 | Allen et al. |
| 2018/0370029 A1 | 12/2018 | Hall et al. |
| 2018/0370033 A1 | 12/2018 | Geffen et al. |
| 2018/0373580 A1 | 12/2018 | Ertl et al. |
| 2018/0374051 A1 | 12/2018 | Li et al. |
| 2019/0066013 A1 | 2/2019 | Gupta et al. |
| 2019/0116387 A1* | 4/2019 | Anderson ............. H04L 65/612 |
| 2019/0124100 A1 | 4/2019 | Shannon et al. |
| 2019/0126463 A1 | 5/2019 | Purushothaman |
| 2019/0129824 A1 | 5/2019 | Radhakrishnan et al. |
| 2019/0141125 A1 | 5/2019 | Ogrinz et al. |
| 2019/0155225 A1* | 5/2019 | Kothandaraman .... G06N 3/006 |
| 2019/0180746 A1 | 6/2019 | Diwan et al. |
| 2019/0244149 A1 | 8/2019 | Krishnaswamy |
| 2019/0266254 A1 | 8/2019 | Blumenfeld et al. |
| 2019/0286736 A1 | 9/2019 | Sturtivant |
| 2019/0324781 A1 | 10/2019 | Ramamurthy et al. |
| 2019/0332508 A1* | 10/2019 | Goyal ................. G06F 11/3414 |
| 2019/0392949 A1 | 12/2019 | Schermeier et al. |
| 2020/0065334 A1 | 2/2020 | Rodriguez et al. |
| 2020/0152044 A1 | 5/2020 | Vance et al. |
| 2020/0287992 A1 | 9/2020 | Berg et al. |
| 2021/0107164 A1 | 4/2021 | Singh et al. |
| 2021/0109503 A1 | 4/2021 | Singh |
| 2021/0110256 A1 | 4/2021 | Singh et al. |
| 2021/0110318 A1 | 4/2021 | Singh |

FOREIGN PATENT DOCUMENTS

| | | |
|---|---|---|
| CN | 109102145 A | 12/2018 |
| CN | 109495669 A | 3/2019 |
| CN | 109791642 A | 5/2019 |
| CN | 110023962 A | 7/2019 |
| CN | 110023965 A | 7/2019 |
| EP | 3133539 A1 | 2/2017 |
| IN | 201841032794 A | 9/2019 |
| JP | 2005276170 A | 10/2005 |
| JP | 2013003884 A | 1/2013 |
| JP | WO2016129275 A1 | 12/2017 |
| JP | 2019049899 A | 3/2019 |
| JP | 2019104578 A | 6/2019 |
| JP | 2019159556 A | 9/2019 |
| JP | 2019169044 A | 10/2019 |
| WO | 2017223083 A1 | 12/2017 |
| WO | 2019195121 A1 | 10/2019 |

OTHER PUBLICATIONS

Di Bisceglie et al., "Data-driven Insights to Robotic Process Automation with Process Mining," Compact 2019 3 available at (last accessed Dec. 6, 2019).

International Search Report and Written Opinion of the International Search Authority issued by the Korean Intellectual Property Office (KIPO) on Nov. 23, 2020.

International Search Report and Written Opinion of the International Search Authority issued by the Korean Intellectual Property Office (KIPO) on Nov. 27, 2020.

International Search Report and Written Opinion of the International Search Authority issued by the Korean Intellectual Property Office (KIPO) on Dec. 1, 2020.

International Search Report and Written Opinion of the International Search Authority issued for PCT Application No. PCT/US2020/046071 on Dec. 14, 2020.

Ki-Bong Kim, "A Study of Convergence Technology in Robotic Process Automation for Task Automation," Journal of Convergence for Information Technology, vol. 9. No. 7, pp. 8-13, ISSN 2586-4440, DOI: https://doi.org/10.22156/CS4SMB.2019.9.7.008 (Jul. 2019).

Angelica Ruiz, "Non-Final Office Action", issued Dec. 7, 2023, U.S. Appl. No. 18/317,410.

Charles E Anya, "Notice of Allowance", issued Aug. 30, 2023, U.S. Appl. No. 17/506,292.

Angelica Ruiz, "Non-Final Office Action", issued Sep. 16, 2022, U.S. Appl. No. 17/506,219.

Angelica Ruiz, "Notice of Allowance", issued Nov. 14, 2022, U.S. Appl. No. 17/506,219.

Charles E Anya, "Final Office Action", issued Sep. 19, 2022, U.S. Appl. No. 16/708,036.

Charles E Anya, "Non-Final Office Action", issued Nov. 25, 2022, U.S. Appl. No. 17/506,292.

Jean Bruner Jeanglaude, "Corrected Notice of Allowability", issued Sep. 21, 2022, U.S. Appl. No. 16/707,705.

Angelica Ruiz, "Non-Final Office Action", issued Feb. 17, 2023, U.S. Appl. No. 17/823,185.

Angelica Ruiz, "Notice of Allowance", issued Mar. 31, 2023, U.S. Appl. No. 17/823,185.

Charles E Anya, "Examiner's Answer", issued Apr. 18, 2023, U.S. Appl. No. 16/708,036.

Charles E Anya, "Final Office Action", issued Apr. 6, 2023, U.S. Appl. No. 17/506,292.

First Examination Report issued in Indian Application No. 202217022294 on Jan. 19, 2024.

Angelica Ruiz, "Corrected Notice of Allowability", issued Aug. 17, 2022, U.S. Appl. No. 16/707,564.

Angelica Ruiz, "Notice of Allowance", issued Jun. 24, 2022, U.S. Appl. No. 16/707,564.

Charles E Anya, "Non-Final Office Action", issued Jun. 24, 2022, U.S. Appl. No. 16/708,036.

Jean Bruner Jeanglaude, "Non-Final Office Action", issued Jul. 12, 2022, U.S. Appl. No. 16/707,705.

Jean Bruner Jeanglaude, "Notice of Allowance", issued Sep. 13, 2022, U.S. Appl. No. 16/707,705.

Extended European Search Report issued in European Application No. 20877733.4 on Sep. 22, 2023.

Extended European Search Report issued in European Application No. 20877735.9 on Sep. 20, 2023.

(56) References Cited

OTHER PUBLICATIONS

Extended European Search Report issued in EP Application No. 20875746.8 on Aug. 18, 2023.
Extended European Search Report issued in EP Application No. 20877734.2 on Aug. 28, 2023.
First Examination Report issued in Indian Application No. 202217022182 on Jul. 5, 2023.
First Examination Report issued in Indian Application No. 202217022355 on Jul. 3, 2023.
First Examination Report issued in Indian Application No. 202217022370 on Jul. 3, 2023.
Examination Report, issued May 22, 2024, European Patent Application No. 20877735.9.
Notification of Reasons for Refusal with Translation; issued May 23, 2024, JP Patent Application No. 2022-520176.
Jean Bruner Jeanglaude, "Notice of Allowance", issued Oct. 18, 2023, U.S. Appl. No. 18/051,822.
Angelica Ruiz, "Non-Final Office Action", issued Jun. 6, 2024, U.S. Appl. No. 18/317,410.
Charles E Anya, "Non-Final Office Action", issued Aug. 1, 2024, U.S. Appl. No. 18/511,949.
Decision on Appeal, issued Jul. 2, 2024, U.S. Appl. No. 16/708,036.
Jean Bruner Jeanglaude, "Non-Final Office Action", issued Jun. 25, 2024, U.S. Appl. No. 18/528,023.
2nd Examination Report, issued Mar. 28, 2025, EP Patent Application No. 20877733.4.
Angelica Ruiz, "Non-Final Office Action", issued Oct. 7, 2024, U.S. Appl. No. 18/317,410.
Angelica Ruiz, "Notice of Allowance", issued May 2, 2025, U.S. Appl. No. 18/317,410.
Charles E Anya, "Final Office Action", issued Sep. 24, 2025, U.S. Appl. No. 18/511,949.
Charles E Anya, "Notice of Allowance", issued Sep. 11, 2024, U.S. Appl. No. 16/708,036.
Decision of Rejection, issued Feb. 18, 2025, JP Patent Application No. 2022-520178.
Decision of Rejection, issued Sep. 17, 2024, JP Patent Application No. 2022-520176.
Decision to Grant, issued Aug. 15, 2024, JP Patent Application No. 2022-520177.

Examination Report, issued Jul. 31, 2024, EP Patent Application No. 20877733.4.
First Office Action, issued Nov. 29, 2024, CN Patent Application No. 202080072407.9.
Jean Bruner Jeanglaude, "Notice of Allowance", issued Aug. 28, 2024, U.S. Appl. No. 18/528,023.
Notice of Allowance, issued Feb. 10, 2025, JP Patent Application No. 2022-520183.
Notification of Reasons for Refusal, issued Jun. 26, 2024, JP Patent Application No. 2022-520178.
Notification of Reasons of Refusal, issued Sep. 25, 2024, JP Patent Application No. 2022-520183.
OA Search Report, issued Apr. 30, 2025, CN Patent Application No. 202080072400.7.
Office Action Search Report, issued May 1, 2024, CN Patent Application No. 202080072397.9.
Office Action, issued Apr. 30, 2025, CN Patent Application No. 202080072400.7.
Office Action, issued Feb. 26, 2025, CN Patent Application No. 202080072397.9.
Office Action, issued Jun. 28, 2025, CN Patent Application No. 202080072403.0.
Office Action, issued May 1, 2024, CN Patent Application No. 202080072397.9.
Office Action, issued Oct. 8, 2024, CN Patent Application No. 202080072397.9.
Search Report, issued Jun. 18, 2025, CN Patent Application No. 202080072403.0.
Search Report, issued Nov. 25, 2024, CN Patent Application No. 202080072407.9.
Tamaki, "Making a robot" leave them to a robot, and RPA tool, That you are wise at A.I. Artificial Intelligence, Nikkei computer, Nikkei BP, No. 961, Mar. 29, 2018, p. 14.
Tsubota, "How A.I. Artificial Intelligence to change NW", Telecommunication, 33rd volume, No. 9, the CO. LTD.RIC telecom, Aug. 25, 2016, pp. 5-8.
Examination Report, issued Mar. 9, 2026, EP Patent Application No. 20877733.4.
Charles E Anya, "Notice of Allowance", issued Mar. 27, 2026, U.S. Appl. No. 18/511,949.

* cited by examiner

Figure 1:
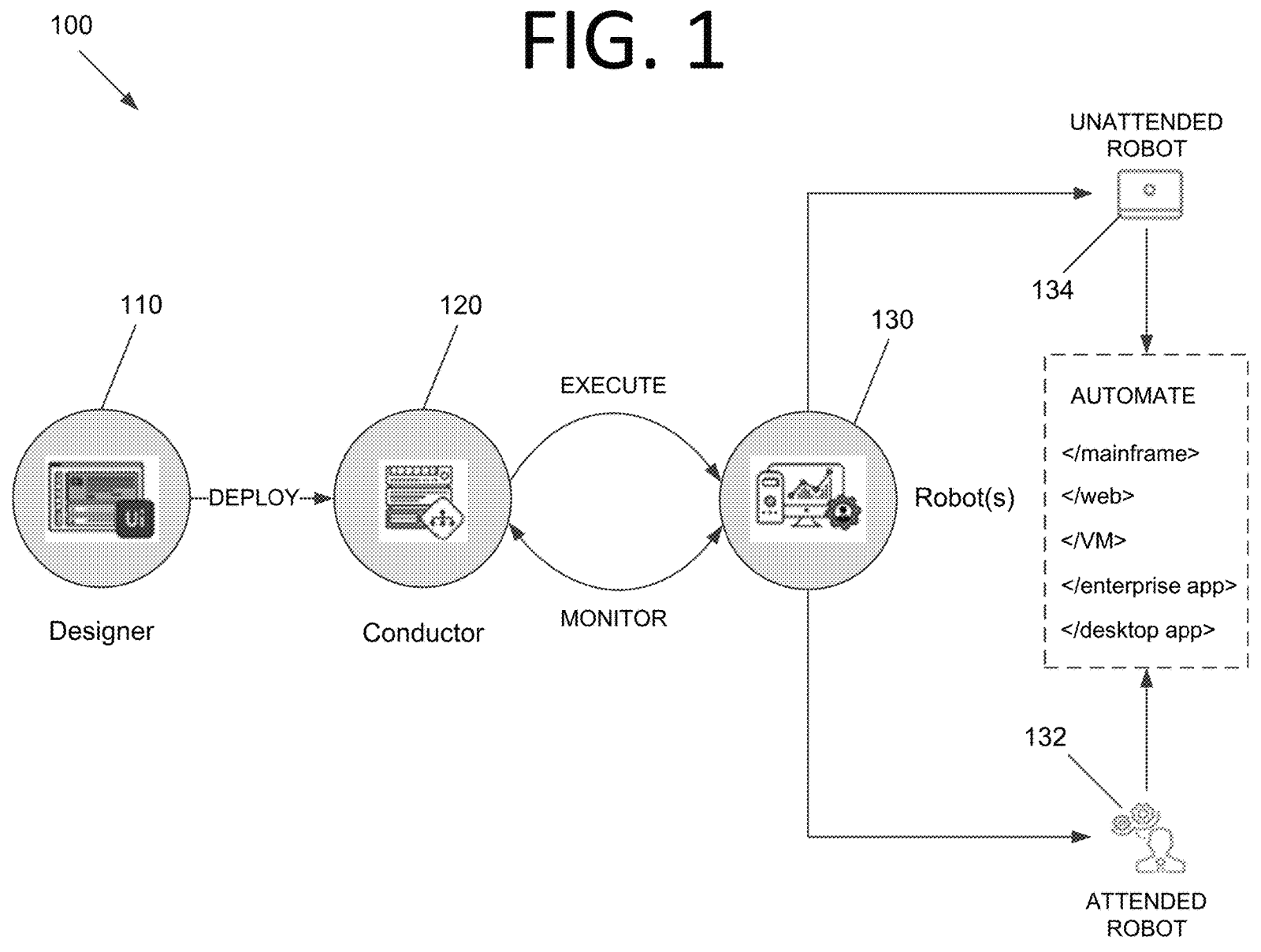

110 Designer

DEPLOY

120 Conductor

EXECUTE

MONITOR

130 Robot(s)

134

UNATTENDED ROBOT

AUTOMATE
</mainframe>
</web>
</VM>
</enterprise app>
</desktop app>

132

ATTENDED ROBOT

200

Client Side

220 Browser

210

212 Executor

214 Agent(s)

216 Designer

230

236 Notification and Monitoring API

232 Web Application (HTML/JS)

Presentation Layer

Config.   Logging   Monitoring   Queues

Config.   Logging   Monitoring   Queues

234 OData REST API Endpoints

Service Layer

238 API Implementation / Business Logic

Persistence Layer

240 Database Server

250 Indexer Server

Server Side

Figure 5:
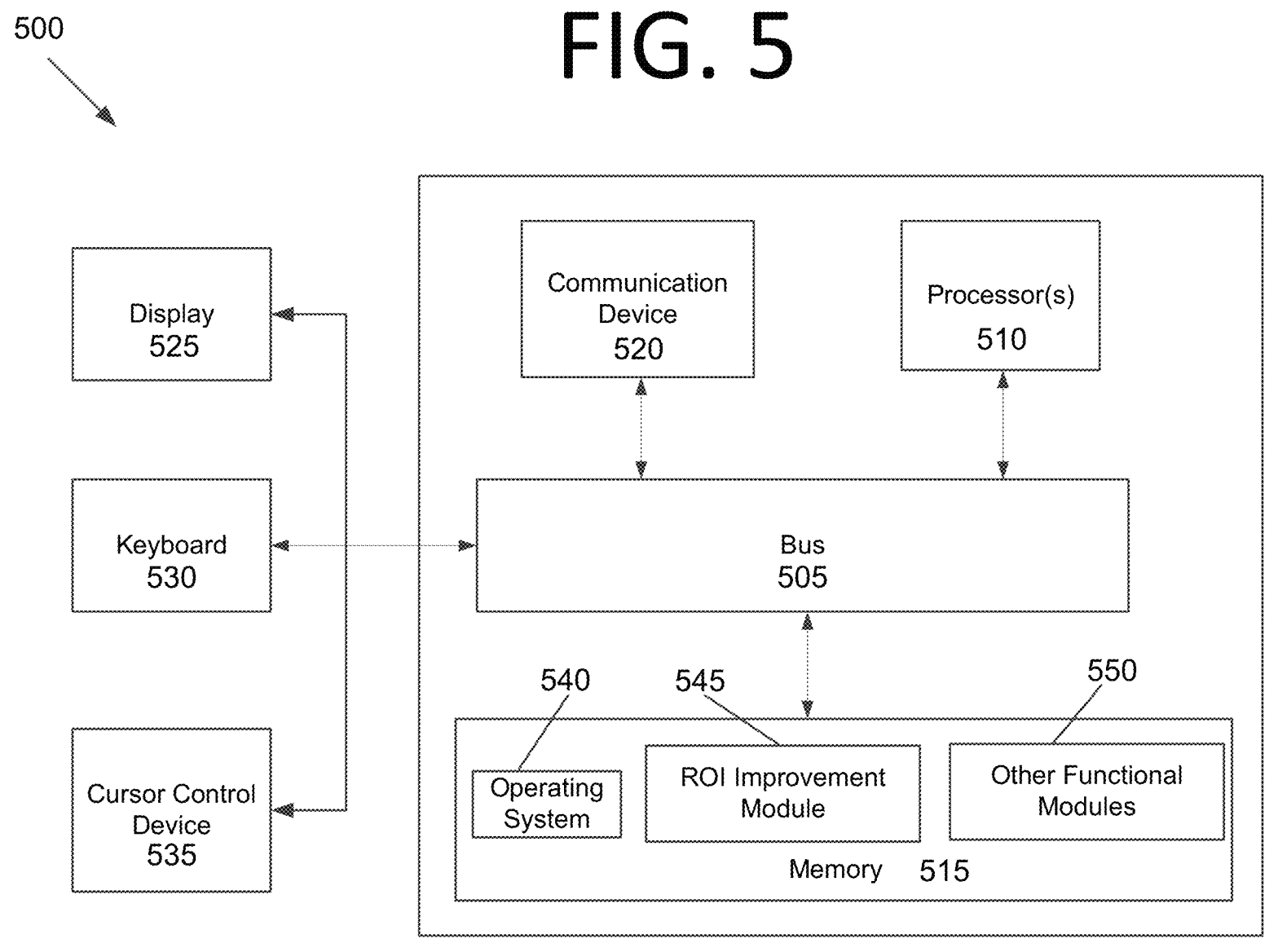

Processor(s) 510

Communication Device 520

Bus 505

Display 525

Keyboard 530

Cursor Control Device 535

Other Functional Modules 550

ROI Improvement Module 545

Operating System 540

Memory 515

700

AUTOMATIC ANALYSIS, PRIORITIZATION, AND ROBOT GENERATION FOR ROBOTIC PROCESS AUTOMATION

CROSS-REFERENCE TO RELATED APPLICATION

This application claims the benefit of U.S. Provisional Patent Application No. 62/915,366 filed Oct. 15, 2019. The subject matter of this earlier filed application is hereby incorporated by reference in its entirety.

FIELD

The present invention generally relates to robotic process automation (RPA), and more specifically, to analyzing, prioritizing, and potentially automatically generating robots implementing beneficial processes and/or process flows for RPA.

BACKGROUND

When determining what to automate next by an RPA Center of Excellence (COE), for example, it can be difficult to prioritize which business processes to focus on (e.g., save the most money and/or time, generate the most additional revenue, etc.). It can also be difficult to even know which processes would be good candidates for automation from an ROI perspective. Although existing automations may be improved, it may be difficult to determine how to improve these automations. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic analysis, prioritization, and potentially automatic generation of robots implementing processes and/or process flows for RPA.

In an embodiment, a computer-implemented method includes deploying listeners to user computing systems, collecting data from the listeners pertaining to user interactions with the computing systems, performance of deployed RPA robots on the user computing systems, or both, and storing the collected data. The computer-implemented method also includes analyzing the stored data using AI to discover processes in the user interactions with the computing systems, process flows in the user interactions with the computing systems, process improvements for existing RPA robots, or any combination thereof, that improve ROI. The computer-implemented method further includes generating a workflow implementing an identified process or process flow for ROI improvement.

In another embodiment, a computer program is embodied on a nontransitory computer-readable medium. The program is configured to cause at least one processor to collect data from a plurality of listeners pertaining to user interactions with respective computing systems, performance of deployed RPA robots on the user computing systems, or both. The program is also configured to cause the at least one processor to analyze the collected data using artificial intelligence (AI) to discover processes in the user interactions with the computing systems, process flows in the user interactions with the computing systems, process improvements for existing RPA robots, or any combination thereof, that improve return on investment (ROI). The program is further configured to cause the at least one processor to generate a workflow implementing an identified process or process flow for ROI improvement.

In yet another embodiment, an apparatus includes memory storing computer program instructions for analyzing, prioritizing, and automatically generating robots implementing processes, process flows, or both, for RPA. The apparatus also includes at least one processor communicably coupled to the memory and configured to execute the computer program instructions. The instructions are configured to cause the at least one processor to collect data from a plurality of listeners pertaining to user interactions with respective computing systems, performance of deployed RPA robots on the user computing systems, or both. The instructions are also configured to cause the at least one processor to analyze the collected data using AI to discover processes in the user interactions with the computing systems, process flows in the user interactions with the computing systems, process improvements for existing RPA robots, or any combination thereof, that improve ROI. The instructions are further configured to cause the at least one processor to generate a workflow implementing an identified process or process flow for ROI improvement, generate an RPA robot implementing the generated workflow, and deploy the generated RPA robot to at least one of the user computing systems.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is an architectural diagram illustrating an RPA system, according to an embodiment of the present invention.

FIG. 5 is an architectural diagram illustrating a computing system configured to analyze, prioritize, and potentially automatically generate robots implementing processes for RPA, according to an embodiment of the present invention.

DETAILED DESCRIPTION OF THE EMBODIMENTS

Figure 2:
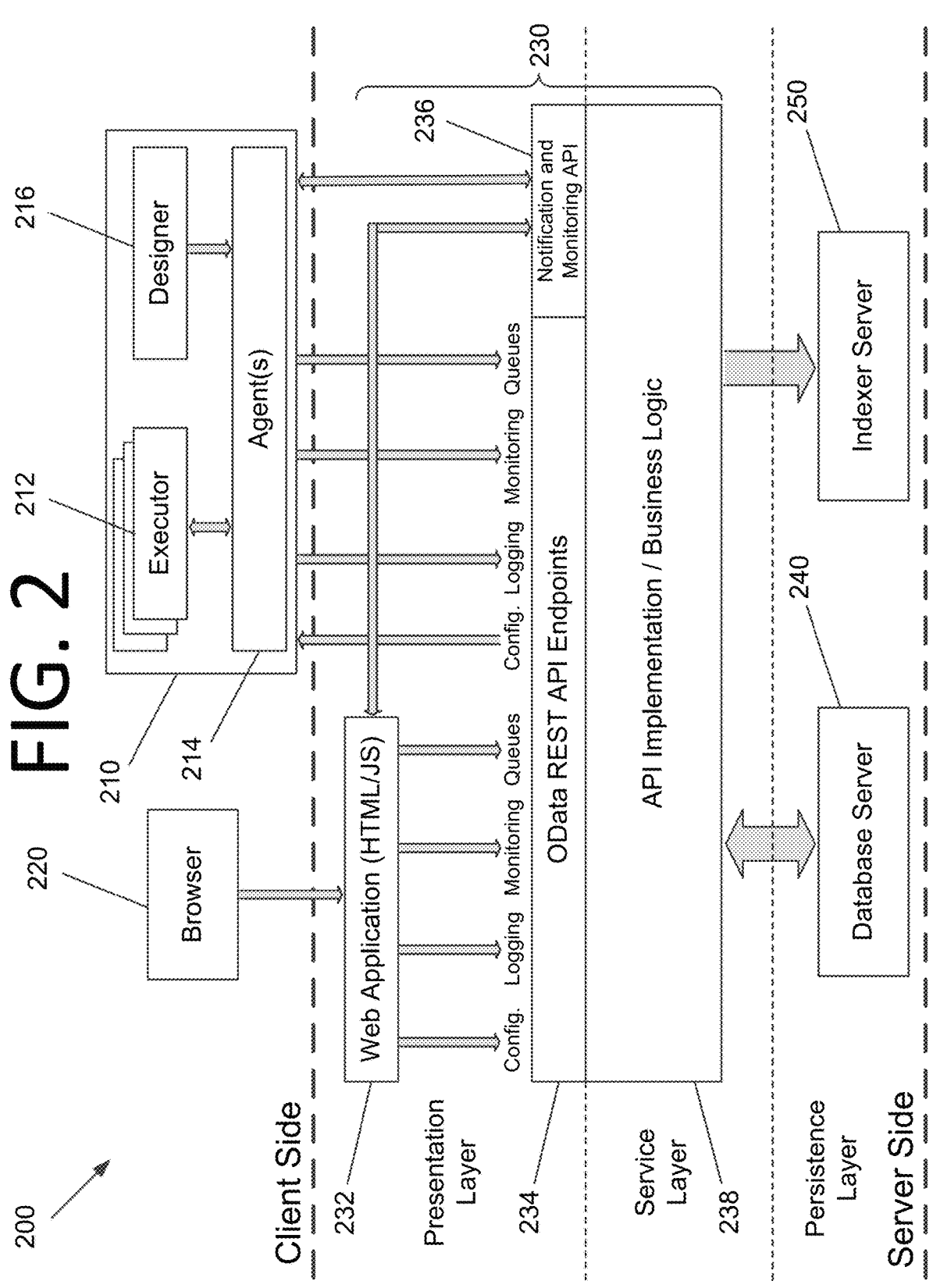
FIG. 2 is an architectural diagram illustrating a deployed RPA system, according to an embodiment of the present invention.

Some embodiments pertain to analyzing, prioritizing, and potentially automatically generating robots implementing processes and/or process flows for RPA. In some embodiments, artificial intelligence (AI) may be used to analyze business processes and look for possible candidates for automation or improvement of existing automations. Listeners (e.g., robots, separate software applications, operating system extensions, etc.) may be employed to listen in the background on user computing systems to mine data pertaining to workflow effectiveness. For example, when automations are placed into production via robots implementing RPA workflows on user computing systems, listeners may be added to ensure that the process(es) are correctly and accurately performing what they are intended for and/or provide data for automation of new processes.

A process may have multiple variations (i.e., process flows) that essentially accomplish the same task. It may thus be desirable to know which process flow(s) of the various process flows for a process are being used relatively frequently, which process flow(s) are being used relatively infrequently, etc.

In some embodiments, conformance checking may be performed. The system may check user interactions with their computing systems via the respective listeners to ensure that users are conforming to a certain workflow. For instance, consider the case where a series of steps are to be taken after a hacking event is detected, ending in filing a certain report. Information gleaned from the listeners could be analyzed to ensure that the steps were appropriately followed, that the report was filed, that the report was filled out correctly, etc. Users who do not follow the workflow properly could be retrained.

Some embodiments may also be useful for determining which implemented workflows are most beneficial. By way of non-limiting example, consider the case where 16 workflows are implemented by RPA robots on user computing systems. Listeners may listen to collect data with respect to user actions, robot performance, or both. This data may be stored in a database and then accessed by a server-side application to apply AI and look for processes users tend to perform that may be automated to improve ROI, whether one implemented robot improves ROI better than another robot for a similar task, etc. For instance, A/B (split) testing or canary testing may be employed to determine which robots work best. These processes may be ranked and rolled out as RPA robots based on the estimated benefit to ROI.

Additionally or alternatively, this data may be analyzed to identify new processes that would be ROI-improving candidates for RPA. To determine whether there are advantages to improving workflows implemented via existing robots, whether new processes may be automated to improve ROI, or both, different metrics may be used. These metrics include, but are not limited to, average process completion time, number of iterations of a process, total revenue generated from invoices to show ROI from processing, whether employee workload exceeds a predetermined threshold (e.g., an employee workload rate of less than 70% may be desired, meaning the employee is working on business tasks less than 70% of the time to reduce fatigue), whether employees are working on business tasks for at least a minimum threshold amount of the time, business-specific key performance indicators (KPIs) (e.g., amount of revenue generated, time taken, etc.) by user/division/company, any combination thereof, etc. In some embodiments, the metrics may be weighted such that some are more influential than others.

In certain embodiments, listener robots periodically send a heartbeat to a conductor application. The information sent in this "heartbeat" may indicate whether the robot is still operating and may provide data from the listeners with respect to robot and/or user operations. In some embodiments, the listener robots may provide information pertaining to the effectiveness of a given workflow (typically, a robot is the executable implementation of a workflow). Using this example of 16 robots, if 16 robots are executing 16 different workflows, the information sent with the heartbeat with respect to the operation of each robot can be captured and analyzed to determine workflow effectiveness and the effect on ROI. A listener robot may also be used to monitor user actions.

Per the above, in addition to or in lieu of analyzing implemented workflows in existing robots, some embodiments glean information from listener robots, potentially as information provided to a conductor application with or in the heartbeats. Once this information is collected, AI may be used to analyze this data and automatically identify, and potentially prioritize, workflow(s) that would improve ROI. These workflows can then be generated with developer assistance via a designer application or potentially automatically and deployed.

In some automated embodiments, this could be accomplished by using AI to intelligently identify the steps of a workflow that may implement a perceived beneficial process for ROI improvement. For instance, the AI analysis may determine that users are more productive when, upon initially booting up, a suite of software applications is automatically launched with certain parameters and/or configurations already present.

In one nonlimiting example, econometrics are used to determine the highest automation ROI. However, with econometrics, it should be noted that the time and costs of the task (e.g., hours someone spends doing a task and what they are paid) are generally required as a precondition in order to employ this approach. Also, with econometrics, the most quantitative metric to track should be determined. This could be the most money saved or generated, for example.

Unlike traditional approaches that fall apart when the sample size is low, some embodiments have a robot look at which processes are better and which processes are worse. In other words, the robot may compare the processes to identify the superior processes, or to identify processes that reduce performance. Some embodiments may allow for robots to monitor these processes running in one or more external applications, implemented by users, watched via listeners, etc.

When the ROI of the known and/or discovered processes is determined and prioritized, AI may be used to determine the ideal automation route (i.e., the RPA workflow implementing the process). A designer application may then be used to build the workflow, create a robot based on the workflow, and deploy the robot to carry out the workflow. The designer application may also auto-generate and/or auto-reconfigure the workflows using ROI as a metric in some embodiments. For instance, in addition to generating the new or revised workflow automatically, the system may change configurations of the workflow to operate more efficiently.

In certain embodiments, the listener may receive automatic alerts when the robot is not being utilized, is waiting for human input, or both. This may help to determine whether the suboptimal ROI comes from non-utilization or misutilization that arises from a user not being productive, etc. The user may then be trained to more effectively make use of the automation.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, Sales-Force®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), there are multiple robots running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser

220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
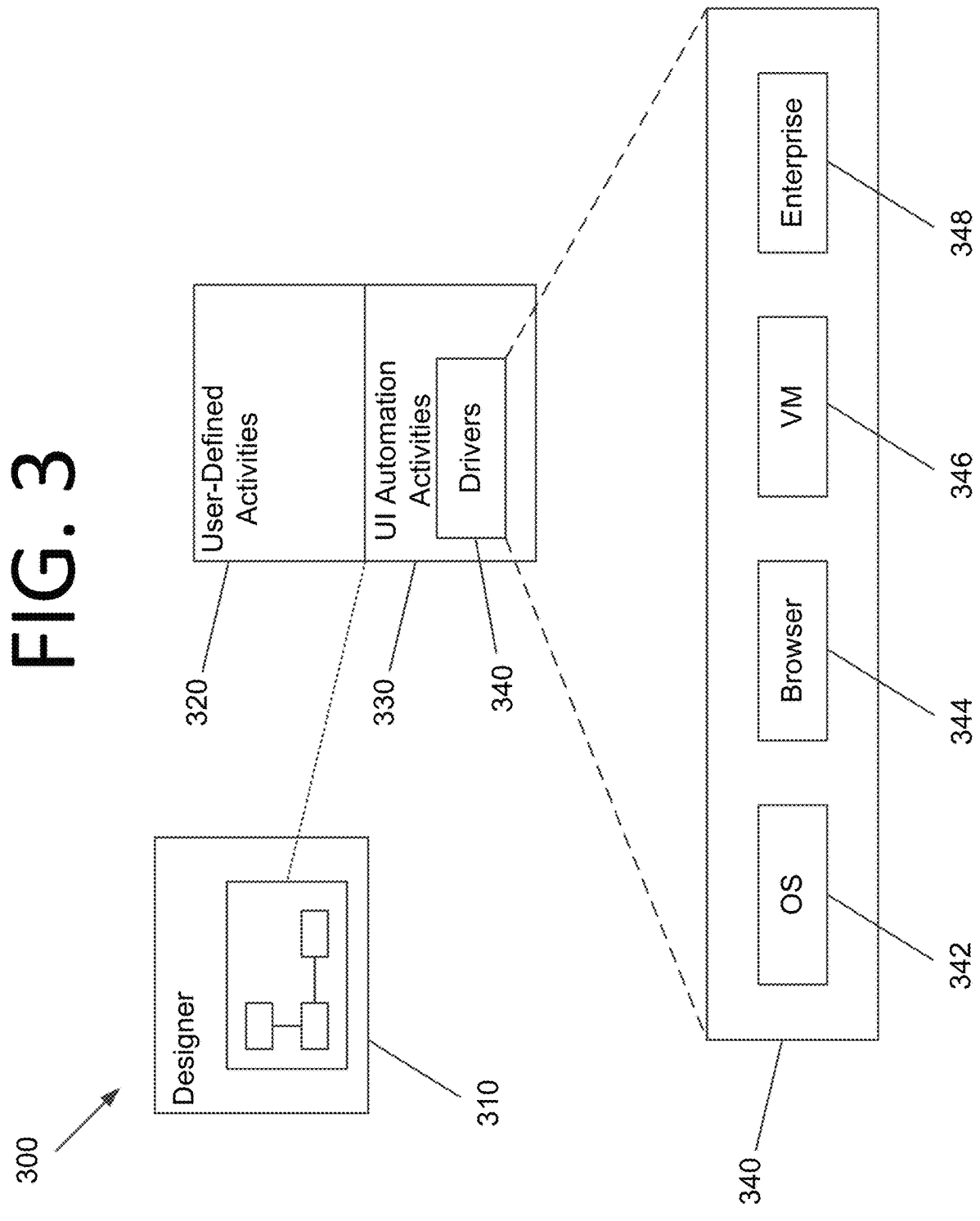
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
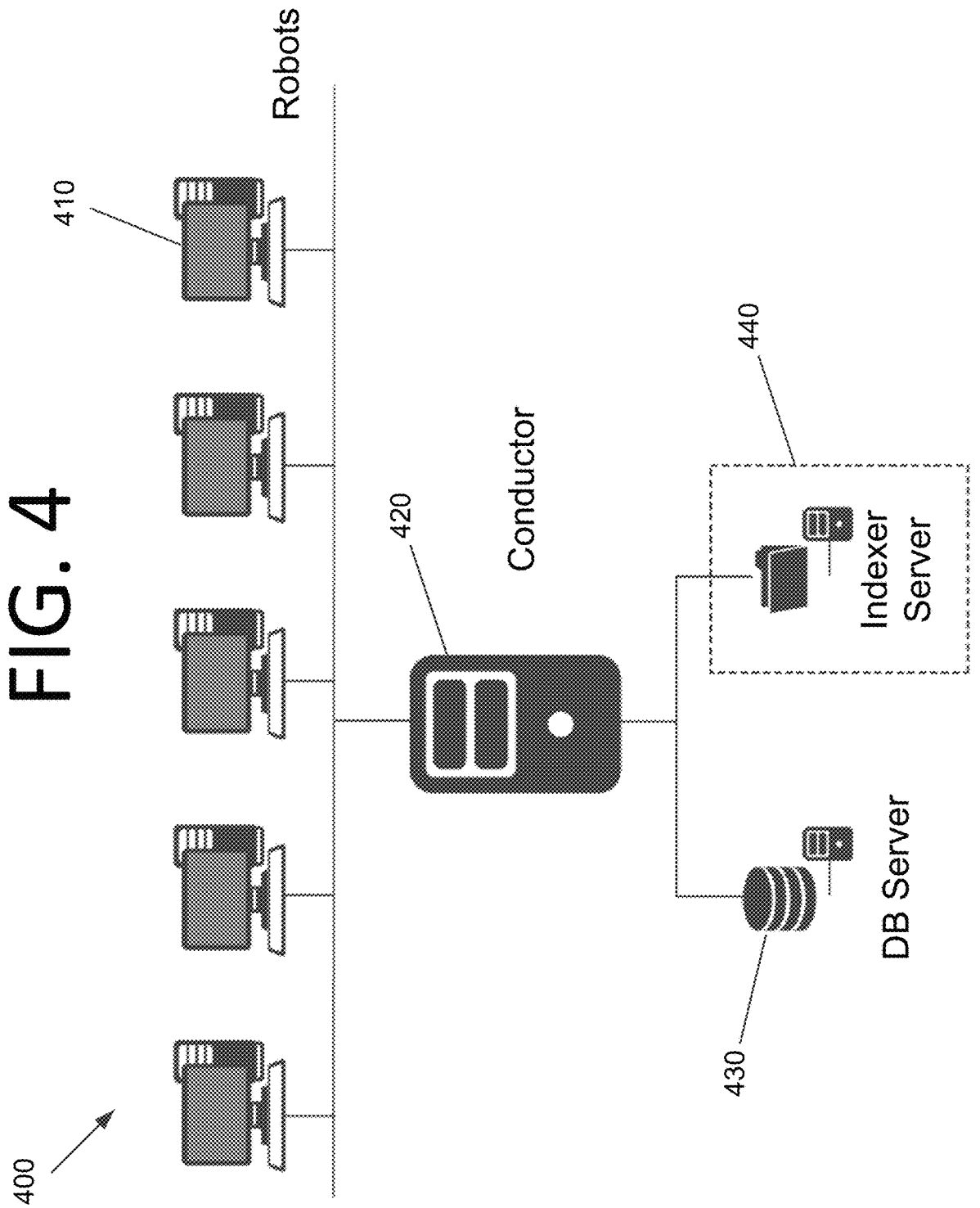
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

FIG. 5 is an architectural diagram illustrating a computing system 500 configured to analyze, prioritize, and potentially automatically generate robots implementing processes for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an ROI improvement module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
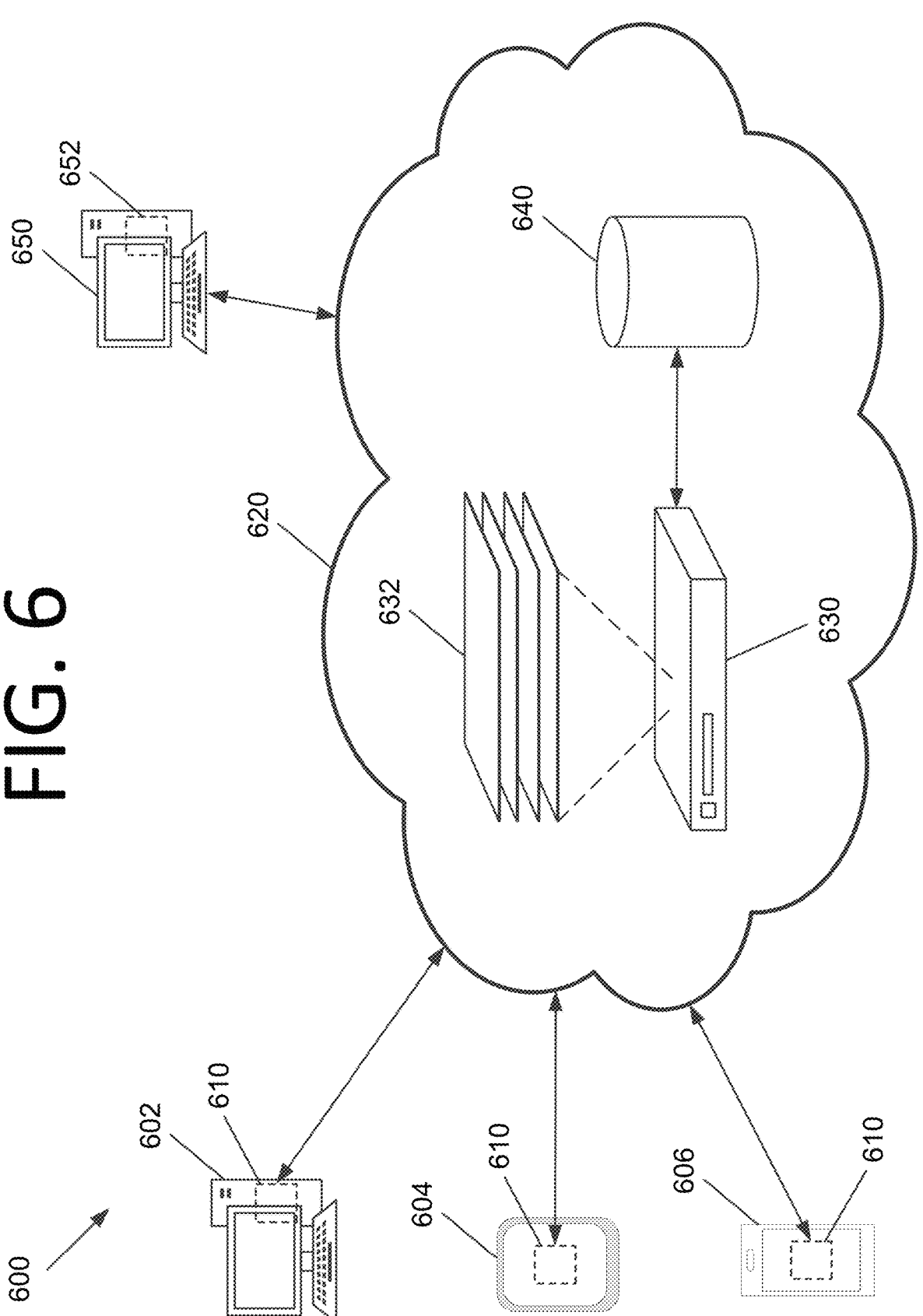
FIG. 6 is an architectural diagram illustrating a system configured to perform automatic analysis, prioritization, and potentially automatic generation of robots implementing processes for RPA, according to an embodiment of the present invention.

FIG. 6 is an architectural diagram illustrating a system 600 configured to perform automatic analysis, prioritization, and potentially automatic generation of robots implementing processes for RPA, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, Internet-of-Things (IoT) devices, vehicle computing systems, etc.

Each computing system 602, 604, 606 has a listener 610 installed thereon. Listeners 610 may be robots generated via an RPA designer application, part of an operating system, a downloadable application for a personal computer (PC) or smart phone, or any other software and/or hardware without deviating from the scope of the invention. Indeed, in some embodiments, the logic of one or more of listeners 610 is implemented partially or completely via physical hardware.

Listeners 610 generate logs of user interactions with the respective computing system 602, 604, 606 and/or log data pertaining to operations of robots running thereon. Listeners 610 then send the log data via a network 620 (e.g., a local area network (LAN), a mobile communications network, a satellite communications network, the Internet, any combination thereof, etc.) to a server 630. The data that is logged may include, but is not limited to, which buttons were clicked, where a mouse was moved, the text that was entered in a field, that one window was minimized and another was opened, the application associated with a window, etc. In some embodiments, server 630 may run a conductor application and the data may be sent periodically as part of the heartbeat message. In certain embodiments, the log data may be sent to server 630 once a predetermined amount of log data has been collected, after a predetermined time period has elapsed, or both. Server 630 stores the received log data from listeners 610 in a database 640.

When instructed by a human user (e.g., an RPA engineer or a data scientist), when a predetermined amount of log data has been collected, when a predetermined amount of time has passed since the last analysis, etc., server 630 accesses log data collected from various users by listeners 610 from database 640 and runs the log data through multiple AI layers 632. AI layers 632 process the log data and identify one or more potential processes for ROI improvement therein, identify improvements to existing processes, or both. AI layers 632 may perform statistical modeling (e.g., hidden Markov models (HMMs)) and utilize deep learning techniques (e.g., long short term memory (LSTM) deep learning, encoding of previous hidden states, etc.) and perform case identification to identify an atomic instance of a process. For invoice processing, for example, completion of one invoice may be a case. The system thus determines where one case finishes and the next case begins. Opening an email may be the start of a case, for example, and the patterns of the cases may be analyzed to determine variations and commonalities.

In some embodiments, identified processes may be listed for a user to peruse, and may be sorted by various factors including, but not limited to, an RPA score indicating how suitable a given process is to RPA (e.g., based on complexity of the automation, execution time, perceived benefit to key performance indicators such as revenue generated, revenue saved, time saved, etc.), process name, total recording time, the number of users who executed the process, process execution time (e.g., least or most time), etc. The process workflow may be displayed when a user clicks on a given process, including steps, parameters, and interconnections. In certain embodiments, only process activities that appear to be important from a clustering perspective may be used.

If a similar process already exists, server 630 may identify this similarity and know that the identified process should replace an existing process for the same or a similar automation that works less optimally. For example, similarities between processes may be determined by a common beginning and end and some amount of statistical commonality in the steps taking in between. Commonality may be determined by entropy, minimization of a process detection objective function, etc. The objective function threshold may be set automatically in some embodiments, and this may be modified during training if processes that were identified as dissimilar by the system are indicated as being similar by a user. Server 630 may then automatically generate a workflow including the identified process, generate a robot implementing the workflow (or a replacement robot), and push the generated robot out to user computing systems 602, 604, 606 to be executed thereon.

Alternatively, in certain embodiments, suggested processes from AI layers 632 may be presented to an RPA engineer via a designer application 652 on a computing system 650. The RPA engineer can then review the workflow, make any desired changes, and then deploy the workflow via a robot to computing systems 602, 604, 606, or cause the robot to be deployed. For example, deployment may occur via a conductor application running on server 630 or another server, which may push a robot implementing the process out to user computing systems 602, 604, 606. In some embodiments, this workflow deployment may be realized via automation manager functionality in the designer application, and the RPA engineer may merely click a button to implement the process in a robot.

Listeners

In order to extract data pertaining to actions taken by users on computing systems 602, 604, 606, listeners 610 may be employed on the client side at the driver level (e.g., drivers 340 of FIG. 3) to extract data from whitelisted applications. For example, listeners 610 may record where a user clicked on the screen and in what application, keystrokes, which button was clicked, instances of the user switching between applications, focus changes, that an email was sent and what the email pertains to, etc. Additionally or alternatively, listeners 610 may collect data pertaining to robots operating on computing systems 602, 604, 606. In some embodiments, the robots that perform various tasks implementing workflows may function as listeners for their own operations. Such data can be used to generate high-fidelity logs of the user's interactions with computing systems 602, 604, 606 and/or the operation(s) of robots running thereon.

In addition to or alternatively to generating log data for process extraction, some embodiments may provide insights into what users are actually doing. For instance, listeners 610 may determine which applications the users are actually using, what percentage of the time users are using a given application, which features within the application the users are using and which they are not, etc. This information may be provided to a manager to make informed decisions regarding whether to renew a license for an application, whether to not renew a license for a feature or downgrade to a less expensive version that lacks the feature, whether a user is not using applications that tend to make other employees more productive so the user can be trained appropriately, whether a user spends a large amount of time performing non-work activities (e.g., checking personal email or surfing the web) or away from his or her desk (e.g., not interacting with the computing system), etc.

In some embodiments, detection updates can be pushed to the listeners to improve their driver-level user interaction and/or robot operation detection and capture processes. In certain embodiments, listeners 610 may employ AI in their detection. In certain embodiments, robots implementing processes from automation workflows may automatically be pushed to computing systems 602, 604, 606 via respective listeners 610.

Figure 7:
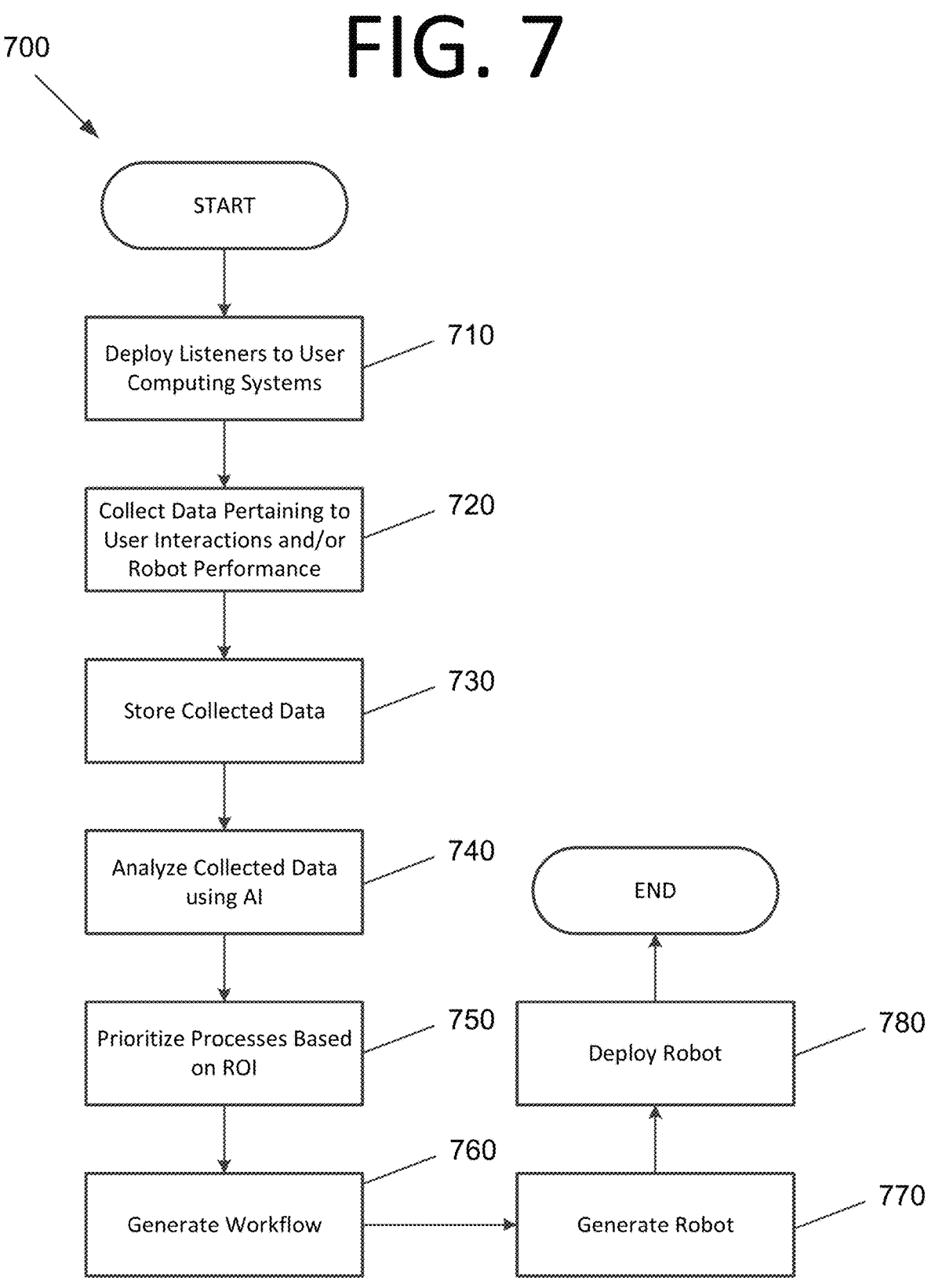
FIG. 7 is a flowchart illustrating a process for analyzing, prioritizing, and automatically generating robots implementing processes for RPA, according to an embodiment of the present invention.

FIG. 7 is a flowchart illustrating a process 700 for analyzing, prioritizing, and automatically generating robots implementing processes for RPA, according to an embodiment of the present invention. Listeners are deployed to user computing systems at 710. Data pertaining to user interactions with the computing systems, performance of deployed robots on the user computing systems, or both, is collected from the listeners at 720. The collected data is stored at 730 and analyzed using AI at 740 to look for processes, process flows, or both, in user interactions with the computing systems, process improvements for existing robots, or both, that improve ROI. A process may have multiple variations (i.e., process flows) that essentially accomplish the same task. It may thus be desirable to know which process flow(s) of the various process flows for a process are being used relatively frequently, which process flow(s) are being used relatively infrequently, etc. As such, the analysis may include determining process flow usage over a time period or throughout the entire history of the process flow in some embodiments. In certain embodiments, the analysis may include performing conformance checking.

In some embodiments, the results of the analysis are ranked based on the estimated benefit to ROI. In certain embodiments, various metrics may be used to determine and prioritize ROI improvements that include, but are not limited to, average process completion time, total revenue generated from invoices to show ROI from processing, whether employee workload exceeds a predetermined threshold, whether employees are working on business tasks for at least a minimum threshold amount of the time, business-specific KPIs, or any combination thereof. In certain embodiments, the listeners periodically send a heartbeat to a conductor application including data with respect to robot and/or user operations.

Once the data is analyzed, the processes, process flows, or both, are prioritized based on their estimated ROI at 750. A workflow implementing an identified ROI-improving process or process flow for ROI improvement is generated at 760. A robot implementing the workflow is then generated at 770, and the robot is deployed to the user computing system(s) at 780. In some embodiments, steps 760, 770, and/or 780 are performed automatically. In certain embodiments, steps 760, 770, and/or 780 are performed by an RPA developer.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
deploying listeners to user computing systems;
collecting data from the listeners pertaining to user interactions with the computing systems, performance of deployed robotic process automation (RPA) robots on the user computing systems, or both;
storing the collected data;
analyzing the stored data using artificial intelligence (AI) by running the stored data through multiple AI layers to discover processes in the user interactions with the computing systems, process flows in the user interactions with the computing systems, process improvements for existing RPA robots, or any combination thereof, that improve return on investment (ROI); and
generating a workflow implementing an identified process or process flow for ROI improvement, wherein
the workflow is configured to be executed as an automation by one or more RPA robots.

2. The computer-implemented method of claim 1, wherein results of the analysis of the stored data are ranked based on an estimated benefit to ROI.

3. The computer-implemented method of claim 2, further comprising:
prioritizing the processes, process flows, or both, based on the ranking.

4. The computer-implemented method of claim 3, wherein metrics used to determine and prioritize ROI improvements comprise average process completion time, total revenue generated from invoices to show ROI from processing, whether employee workload exceeds a predetermined threshold, whether employees are working on business tasks for at least a minimum threshold amount of the time, business-specific key performance indicators (KPIs), or any combination thereof.

5. The computer-implemented method of claim 4, wherein the metrics are assigned weights based on their relative importance to the ROI determination.

6. The computer-implemented method of claim 1, wherein the analysis of the stored data comprises determining a frequency of usage for the process flows.

7. The computer-implemented method of claim 1, wherein the analysis of the stored data comprises performing conformance checking to ensure that the users are conforming to a workflow.

8. The computer-implemented method of claim 1, wherein the data is collected from the listeners via a heartbeat that is periodically sent to a conductor application comprising data with respect to robot and/or user operations.

9. The computer-implemented method of claim 1, further comprising:
generating an RPA robot implementing the generated workflow; and
deploying the generated RPA robot to at least one of the user computing systems.

10. A computer program embodied on a non-transitory computer-readable medium, the program configured to cause at least one processor to:
collect data from a plurality of listeners pertaining to user interactions with respective computing systems, performance of deployed robotic process automation (RPA) robots on the user computing systems, or both;
analyze the collected data using artificial intelligence (AI) by running the collected data through multiple AI layers to discover processes in the user interactions with the computing systems, process flows in the user interactions with the computing systems, process improvements for existing RPA robots, or any combination thereof, that improve return on investment (ROI); and generate a workflow implementing an identified process or process flow for ROI improvement, wherein the workflow is configured to be executed as an automation by one or more RPA robots.

11. The computer program of claim 10, wherein the program is further configured to cause the at least one processor to rank the results of the analysis of the collected data based on an estimated benefit to ROI.

12. The computer program of claim 11, wherein the program is further configured to cause the at least one processor to:

prioritize the processes, process flows, or both, based on the ranking.

13. The computer program of claim 12, wherein metrics used to determine and prioritize ROI improvements comprise average process completion time, total revenue generated from invoices to show ROI from processing, whether employee workload exceeds a predetermined threshold, whether employees are working on business tasks for at least a minimum threshold amount of the time, business-specific key performance indicators (KPIs), or any combination thereof.

14. The computer program of claim 10, wherein the analysis of the collected data comprises determining a frequency of usage for the process flows.

15. The computer program of claim 10, wherein the analysis of the stored data comprises performing conformance checking to ensure that the users are conforming to a workflow.

16. The computer program of claim 10, wherein the data is collected from the listeners via a heartbeat that is periodically sent to a conductor application comprising data with respect to robot and/or user operations.

17. The computer program of claim 10, wherein the program is further configured to cause at least one processor to:

generate an RPA robot implementing the generated workflow; and deploy the generated RPA robot to at least one of the user computing systems.

18. An apparatus, comprising:

memory storing computer program instructions for analyzing, prioritizing, and automatically generating robots implementing processes, process flows, or both, for robotic process automation (RPA); and at least one processor communicably coupled to the memory and configured to execute the computer program instructions, wherein the instructions are configured to cause the at least one processor to:

collect data from a plurality of listeners pertaining to user interactions with respective computing systems, performance of deployed robotic process automation (RPA) robots on the user computing systems, or both;

analyze the collected data using artificial intelligence (AI) by running the collected data through multiple AI layers to discover processes in the user interactions with the computing systems, process flows in the user interactions with the computing systems, process improvements for existing RPA robots, or any combination thereof, that improve return on investment (ROI);

generate a workflow implementing an identified process or process flow for ROI improvement;

generate an RPA robot implementing the generated workflow; and deploy the generated RPA robot to at least one of the user computing systems.

19. The apparatus of claim 18, wherein the instructions are further configured to cause the at least one processor to:

rank results of the analysis of the collected data based on an estimated benefit to ROI; and prioritize the processes, process flows, or both, based on the ranking, wherein metrics used to determine and prioritize ROI improvements comprise average process completion time, total revenue generated from invoices to show ROI from processing, whether employee workload exceeds a predetermined threshold, whether employees are working on business tasks for at least a minimum threshold amount of the time, business-specific key performance indicators (KPIs), or any combination thereof.

20. The apparatus of claim 18, wherein the analysis of the collected data comprises determining a frequency of usage for the process flows.

* * * * *